May 6, 1930.                L. A. HOERR                1,757,570
PIPE CLAMP
Filed March 16, 1928
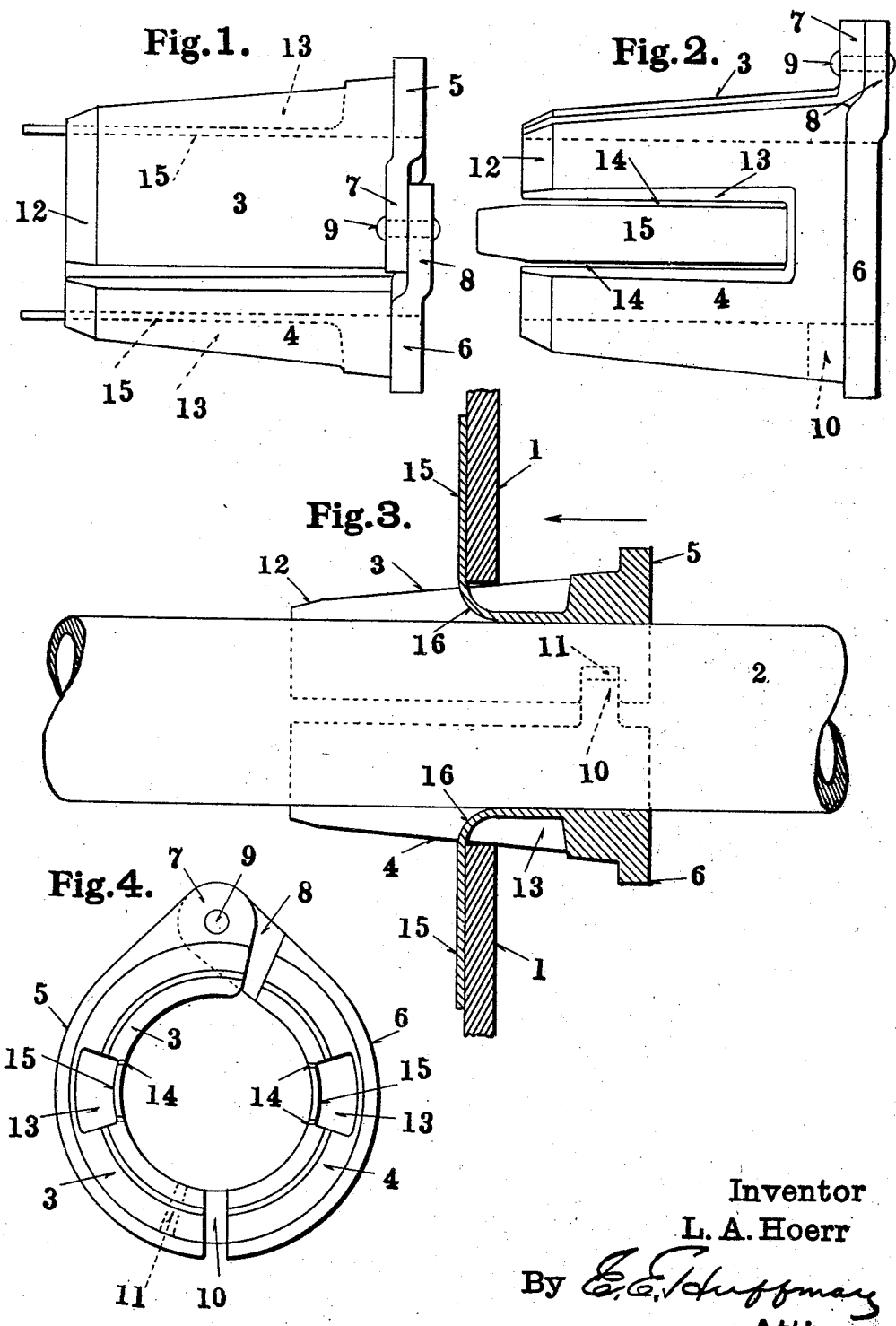
Inventor
L. A. Hoerr
By E. E. Huffman
Att'y.

Patented May 6, 1930

1,757,570

UNITED STATES PATENT OFFICE

LOUIS A. HOERR, OF ST. LOUIS, MISSOURI, ASSIGNOR TO WESTERN RAILWAY EQUIPMENT COMPANY, OF ST. LOUIS, MISSOURI, A CORPORATION OF MISSOURI

PIPE CLAMP

Application filed March 16, 1928. Serial No. 262,253.

My invention relates to pipe clamps and is particularly adapted for securing a train pipe in the cross bearer of a railway car or other similar construction.

The object of my invention is to provide a simple and efficient device which will readily accommodate itself to cross bearer or other supporting plates having pipe openings of varying diameter; and particularly to secure such accommodation without the use of bolts and nuts, rivets or other similar fastening devices.

In the accompanying drawings, which illustrate one form of pipe clamp made in accordance with my invention, Figure 1 is a top plan view; Figure 2 is a side elevation; Figure 3 is a horizontal section showing the clamp in position; and Figure 4 is an end view.

The cross bearer indicated at 1 is provided with a pipe opening for the passage of the train pipe 2. The openings in such cross bearer must be of considerably greater diameter than the external diameter of the pipe to allow of the ready insertion and withdrawal of the pipe so that a pipe clamping device is necessary to support the pipe from the cross bearers. As the pipe openings vary in size it is necessary that the clamping device be capable of adapting itself to such variations as occur in the size of the openings.

My clamp comprises two pipe engaging members 3 and 4 which, while semi-circular in form, are not identical. Each member approximates to one-half of a hollow cylinder the inner face of which is formed on a radius equal to the radius of the outer diameter of the train pipe.

The outer face of each member is concentric with the inner face but is tapered longitudinally to form a wedge engaging with the walls of the pipe opening and thus apply clamping pressure to the pipe when the clamp is driven in the direction of the arrow in Figure 3. In order to facilitate such driving the large ends of the members are extended to form driving flanges 5 and 6 on the members 3 and 4 respectively.

Formed on the driving flange 5 is a lug 7 and on the flange 6 a cooperating lug 8 the two being connected by a rivet 9 to form a hinge securing the two parts together. This not only prevents separation of the parts in transportation but also opposes relative longitudinal movement of the parts in application so that they may be driven into position in unison. So that the hinge need not bear all the driving strain I form on the opposite side of one of the members an interlocking lug 10 and on the other a cooperating recess 11. The small end of each member is preferably chamfered, as shown at 12, to facilitate its insertion into the pipe opening.

Formed in each of the members is a reduced portion 13 providing a relatively thin strip of metal which is separated from the member at its sides by slits 14 to form a retaining finger 15 which, after the device is driven into position, is bent out radially against the face of the cross bearer to hold the device in clamping position.

As the retaining finger is formed at the bottom of the reduced portion a bending space is provided between the finger and the pipe opening so that the bend in the finger is a gradual curve, as shown at 16 in Figure 3. This enables the device to be repeatedly applied and removed without danger of breaking off the finger as might occur if a sharp bend were formed in the finger.

Having fully described my invention, what I claim as new and desire to secure by Letters Patent of the United States is:

1. A device of the class described comprising two members having engagement with each other to prevent relative longitudinal movement but capable of movement toward and away from each other, said members being adapted to surround a pipe and to be driven into an opening in a support, one of said members having an inclined face adapted to cooperate with the edge of the opening to clamp the pipe, and a finger adapted to be bent against the support to hold the device in varying positions in the opening.

2. A device of the class described comprising two members adapted to surround a pipe and to be driven into an opening in a support, said members being hinged together to swing in a plane perpendicular to the axis of the pipe, one of said members being provided with an inclined face adapted to cooperate with the edge of the opening to clamp the pipe, and a finger on one of said members adapted to be bent against the support to hold the device in varying positions in the opening.

3. A device of the class described comprising two members adapted to surround a pipe and to be driven into an opening in a support, said members being hinged together to swing in a plane perpendicular to the axis of the pipe, each of said members being provided with a wedge face adapted to cooperate with the edge of the opening to clamp the pipe, and a finger on each member adapted to be bent into engagement with the support to hold the device in varying positions in the opening.

In testimony whereof, I hereunto affix my signature, this 14th day of March, 1928.

LOUIS A. HOERR.